(12) United States Patent
Kellner

(10) Patent No.: US 10,414,445 B2
(45) Date of Patent: Sep. 17, 2019

(54) HYBRID COMPONENT FOR A VEHICLE

(71) Applicant: Dr. Ing. h.c. F. Porsche Aktiengesellschaft, Stuttgart (DE)

(72) Inventor: Philipp Kellner, Weil der Stadt (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/482,855

(22) Filed: Apr. 10, 2017

(65) Prior Publication Data

US 2017/0291647 A1 Oct. 12, 2017

(30) Foreign Application Priority Data

Apr. 12, 2016 (DE) .................. 10 2016 106 688

(51) Int. Cl.
*B62D 29/00* (2006.01)
*B60R 21/13* (2006.01)

(52) U.S. Cl.
CPC ............ *B62D 29/004* (2013.01); *B60R 21/13* (2013.01); *B60R 2021/132* (2013.01)

(58) Field of Classification Search
CPC ................ B62D 29/004; B62D 29/005; B62D 29/001–005; B60R 21/13; B60R 2021/0018; B60R 2021/0072; B60R 2021/132
USPC ........................................................ 296/205
See application file for complete search history.

(56) References Cited

U.S. PATENT DOCUMENTS

| 6,299,246 B1 * | 10/2001 | Tomka .............. B29C 45/14631 264/250 |
| 9,487,227 B2 * | 11/2016 | Heitz ...................... B29C 70/52 |
| 2003/0070387 A1 | 4/2003 | Klocke et al. |
| 2003/0152745 A1 * | 8/2003 | Wagenblast ...... B29C 45/14467 428/119 |
| 2010/0078925 A1 * | 4/2010 | Froschle ................. B60R 21/13 280/756 |
| 2012/0192654 A1 * | 8/2012 | Kropla ................ B60R 21/0136 73/763 |
| 2015/0158449 A1 * | 6/2015 | Hirata ..................... B60R 21/13 280/756 |
| 2015/0284035 A1 | 10/2015 | Reese |
| 2017/0113732 A1 * | 4/2017 | Lee ......................... B62D 25/04 |
| 2017/0129540 A1 * | 5/2017 | Toiler ................... B62D 21/155 |
| 2017/0291647 A1 * | 10/2017 | Kellner ................ B62D 29/004 |
| 2017/0349129 A1 * | 12/2017 | Schmitt .................... B60R 21/13 |
| 2018/0072346 A1 * | 3/2018 | Pavesio .................. B62D 21/11 |

FOREIGN PATENT DOCUMENTS

| CN | 1412466 A | 4/2003 |
| DE | 102008060358 A1 | 8/2010 |
| WO | WO 2014067604 A1 | 5/2014 |

* cited by examiner

*Primary Examiner* — Gregory A Blankenship
(74) *Attorney, Agent, or Firm* — Leydig, Voit & Mayer, Ltd.

(57) ABSTRACT

A hybrid component for a vehicle includes at least one metal base portion configured to be attached to a basic structure of the vehicle, at least one stabilizing portion made of plastic for mechanically stabilizing the hybrid component, and at least one main portion made of continuous fiber reinforced thermoplastic for absorbing forces that act on the hybrid component. The hybrid component is formed, at least in part, as a hollow profile.

16 Claims, 4 Drawing Sheets

HYBRID COMPONENT FOR A VEHICLE

CROSS REFERENCE TO RELATED APPLICATIONS

This application claims benefit to German Patent Application No. DE 10 2016 106 688.5, filed Apr. 12, 2016, which is incorporated by reference herein.

FIELD

The present invention relates to a hybrid component for a vehicle and to a method for producing such a hybrid component.

BACKGROUND

It is known that hybrid components can be employed in vehicles. Hybrid components usually relate to the combination of different materials in a component. Thus, it is already known that metal components are provided with molded-on injection-molded portions in order that corresponding different properties can be produced in the different portions. It is also known that plastics materials are equipped at least in part with fiber reinforcements in order to achieve greater mechanical stability in these fiber-reinforced portions.

SUMMARY

In an embodiment, the present invention provides a hybrid component for a vehicle. The hybrid component includes a metal base portion configured to be attached to a basic structure of the vehicle, a stabilizing portion made of plastic for mechanically stabilizing the hybrid component, and a main portion made of continuous fiber reinforced thermoplastic for absorbing forces that act on the hybrid component. The hybrid component is formed, at least in part, as a hollow profile.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
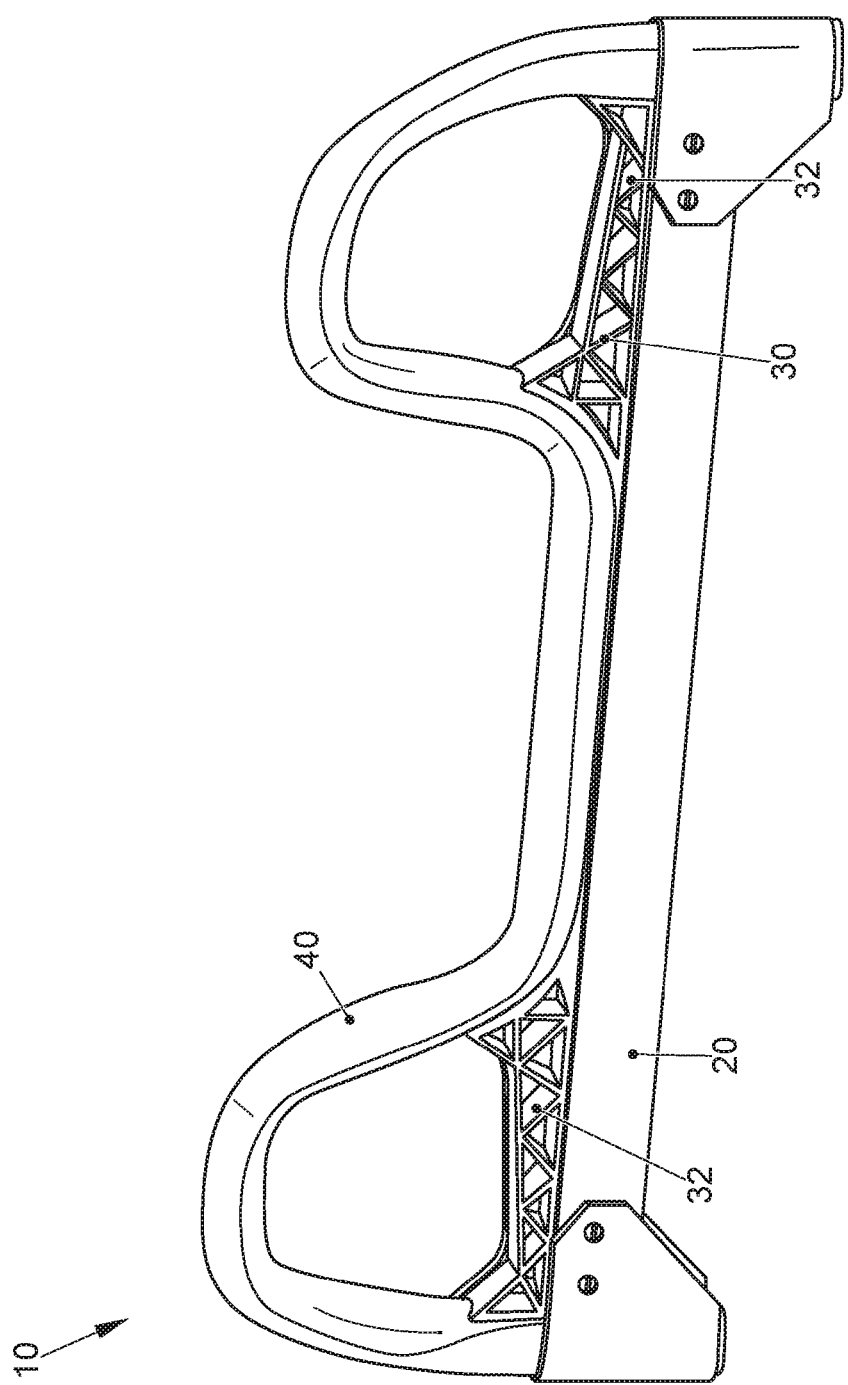
FIG. 1 shows a hybrid component according to an embodiment of the invention in the form of a roll bar.

A disadvantage of the known solutions is that in particular the correlation between fiber-reinforced plastics, normal plastics and the metal base materials is difficult to impossible. This has the result that known hybrid components still have a high weight and are difficult to attach to metal basic structures of the vehicle.

Components are described herein that at least partially remedy the above-described disadvantages. In particular, lightweight components for a vehicle developed in a cost-effective and simple manner are described herein that have the same or even improved mechanical stability.

A hybrid component for a vehicle according to an embodiment of the invention includes a metal base portion for attaching to a basic structure of a vehicle. Furthermore, the hybrid component includes a stabilizing portion made of plastic for mechanically stabilizing the hybrid component. Also provided is a main portion made of continuous fiber reinforced thermoplastic for absorbing forces that act on the hybrid component.

In contrast to the known solutions of hybrid components for vehicles, it is now no longer two different materials but at least three different materials that are united in one and the same component. This is a metal base portion which provides as it were the force-transmitting interface with a basic structure of the vehicle. This metal base portion accordingly has fastening interfaces in order for example to be attached to body interfaces on the body of the vehicle. Thus, the metal base portion can take on at least the functionality of transferring forces which are intended to be introduced into the basic structure of the vehicle. Of course, additional stabilizing functions are also reproducible in the metal base portion. For instance, the metal base portion can itself form part of the basic structure, in particular a part of the body of the vehicle. Thus, it is possible for the metal base portion itself to already provide a stabilizing and force-transmitting or force-absorbing effect for the basic structure of the vehicle. To this end, the metal base portion is preferably in the form of a hollow profile. A preferred embodiment is formed from an extruded aluminum profile.

In addition to the metal base portion, a main portion made of continuous fiber reinforced thermoplastic is now provided. This main portion is designed to absorb defined forces which can act on this main portion. The main portion is in this case distinguished in particular by the fact that the basic type, structure and/or direction of the acting forces is essentially known in advance. Thus, a part of a roll bar of a convertible can be considered the main portion, for example. This roll bar is designed for a defined force action, specifically, in the event of the vehicle overturning, for a compressive action on this roll bar. The corresponding fiber reinforcement by way of continuous fibers in the thermoplastic now has the result that this fiber reinforcement can be designed for the foreseeable action of the forces. This relates in particular to the type of fiber reinforcement, the orientation of the fiber reinforcement and further parameters which can be varied in the configuration of a fiber reinforced plastic.

In order to ensure that the forces which have been introduced into the main portion can also be passed on to the basic structure of the vehicle via the metal base portion, a stabilizing portion is now additionally provided. The stabilizing portion serves for the mechanical stabilization of the entire hybrid component. This is achieved in particular in that the stabilizing portion provides a mechanical stabilizing effect for the main portion in that the forces can be passed on to the metal base portion from the main portion at least in part via the stabilizing portion. For example, for this purpose, the stabilizing portion is likewise provided with a reinforcement, as is explained further below.

Individual functionalities of the hybrid component are divided between different portions. While the metal base portion corresponds in principle to the known components of a body structure of a vehicle, the further portions, specifically in particular the stabilizing portion and the main portion, can be adapted to the corresponding functionality in terms of their actual geometric form. Since, furthermore, both the stabilizing portion and the main portion now no longer have to be formed from a metal material, a high weight saving potential can be achieved. At the same time, in spite of the weight saving potential, mechanical stabilization is achieved through the direction of action of the forces, which is foreseeable in a defined manner, in particular on the main portion, said mechanical stabilization being at least at the level of known implementations with metal materials. Preferably, it is even the case that, by corresponding targeted reinforcement of the main portion and of the stabilizing portion, the mechanical stability of the entire system of the hybrid component even increases in spite of a reduction in the overall weight.

Not least, a hybrid component according to an embodiment of the invention is also still cost-effective to manufacture. Thus, the individual portions can in particular be separately prefabricated. This goes preferably at least for the base portion and the main portion. The stabilizing portion can additionally have a connecting functionality, such that the correlation between the base portion and the main portion is provided thereby not only in a force-transmitting manner but also in a fastening manner. As a result of this separate producibility of the individual portions of the hybrid component, the overall production is quicker and cheaper. Furthermore, shorter cycle times are achieved and so the overall speed, or the possibility of working in parallel, further increases the advantages in the production of a hybrid component according to the invention.

The continuous fiber reinforced thermoplastics which can be used for a main portion should be understood as meaning in particular that the plastic has reinforcing fibers. The type of reinforcing fibers will be described in more detail later but is selected in particular from glass fibers, aramid fibers, basalt fibers or carbon fibers and/or a mixture thereof. As a result of the thermoplastic fiber content within the plastic, what is referred to as consolidation can now take place after the main portion has been assembled. As a result of corresponding heating and melting of the thermoplastic parts in the plastic, a matrix is produced as it were around the continuous fibers, such that a stabilizing effect for the main portion is achieved in this concluding production step.

It may be advantageous when, in a hybrid component according to an embodiment of the invention, the main portion has, at least in part, a planar, in particular flat, main-portion surface. This is a possible embodiment of the main portion according to the invention. A planar shape in the form of a main-portion surface results in particular in planar protection from acting forces. If, for example, a hybrid component according to the invention is used to cover a vehicle seat or a trunk, the planar part of the main portion in the form of the main-portion surface now serves to avoid penetration of articles. It is also possible for the dissipation of tensile, compressive and shear stresses to be provided in a simple and cost-effective manner by such a surface having a small geometric extent and accordingly a low weight and small dimensions. These tensile, compressive and shear stresses run in particular along the planar extent of the main-portion surface. Of course, a combination with other profile shapes in the main portion can also be produced, wherein the individual parts of the main portion can be configured both integrally and in a multipart manner with respect to one another.

It is likewise advantageous when, in a hybrid component according to an embodiment of the invention, the main portion has, at least in part, a main-portion profile which is formed in particular, at least in part, as a hollow profile. Forming the profile of the main portion at least in subportions has the result that, in particular, the action of compressive forces, preferably of laterally acting compressive forces on the profile can be removed in an improved manner. It is again apparent here how the division of a hybrid component into different portions allows the forces actually acting in the respective portion to be focused on. Accordingly, even in the case of complex force actions, a main-portion profile, in particular in the form of the hollow profile, can provide a particularly simple, cost-effective and especially reduced-weight force action and transmission. In the case of a roll bar for a hybrid component, this main-portion profile can be for example the upper bar part on which the first force action occurs when a convertible overturns. In the case of a seat reinforcement in which the hybrid component is used, a frame reinforcement can be provided for example by the main-portion profile. Of course, a main-portion profile is also freely combinable with other forms, in particular a main-portion surface, as was explained in the previous paragraph, without departing from the scope of the present invention.

It may likewise be advantageous when, in a hybrid component according to an embodiment of the invention, the stabilizing portion is formed, at least in part, in the form of ribs and has at least one of the following mechanical reinforcements: short fibers, long fibers, particles.

The above list is not exhaustive. The stabilizing portion serves in this case in particular to transfer or absorb the forces from the main portion to the base portion. Of course, it is also possible for different mechanical reinforcements to be combined with one another. The type of fiber reinforcement can in this case be either identical to, partially identical to or different than the fibers used in the main portion.

A further advantage is achievable when, in a hybrid component according to an embodiment of the invention, the base portion and/or the stabilizing portion and/or the main portion are connected to at least one of the adjoining portions in a force-transmitting manner by a form fit and/or by a material bond. Such an interface portion for a form fit and/or a material bond is thus provided between the base portion and the stabilizing portion, between the base portion and the main portion and/or between the stabilizing portion and the main portion. In this case, a form fit is in principle conceivable between all the adjacent portions. Such a form fit can be achieved for example by overmolding in a final production step, in particular during the attachment between the plastic components of the stabilizing portion and the main portion, for the one part, and the metal base portion, for the other part. The material bond for the application is provided in particular between plastic-containing components, specifically preferably the stabilizing portion and the main portion. A material bond can be achieved for example by melting and fusing together plastic parts of the adjoining portions.

It is furthermore advantageous when, in a hybrid component according to an embodiment of the invention, the stabilizing portion and/or the main portion have at least one insert, in particular in the form of at least one metal insert, preferably for local mechanical stabilization of the stabilizing portion and/or of the main portion. Such inserts, as they are known, are known in principle and serve to introduce additional functionalities into a plastic component. Thus, for example inserts are conceivable which form fastening interfaces. This is achievable for example by metal inserts which have an internal thread and/or, in the form of a bolt, an external thread. Of course, such inserts, in particular in the form of metal inserts, can also serve for mechanical, local stabilization of the respective portion.

It may be a further advantage when, in the hybrid component according to an embodiment of the invention, the main portion has a varying cross section, in particular in the form of a varying profile cross section, over its geometric profile. This thus means that a corresponding profile varies over the geometric profile of the main portion. Thus, a profile of acting forces in the respective portion of the hybrid component can be calculated in advance for example by means of what is known as the FEM method or other mathematical simulation models. The actual profile can now be adapted to this expected profile of acting forces. Very free shaping is possible in particular in the stabilizing portion and/or in the main portion by formation on the basis of a plastic material. In this case, organic shapes and freely variable cross sections are even possible, which can thus provide improved stability of the overall system of the hybrid component given a reduction in the overall weight.

It is also advantageous when, in a hybrid component according to an embodiment of the invention, it is formed at least partially as at least one of the following components: roll bar, structural component of a seat, battery carrier, in particular for electrically powered vehicles, structural component of the body, cockpit carrier.

The above list is not exhaustive. A roll bar should be understood in particular as being a component of a convertible, said component absorbing corresponding forces in the event of the convertible overturning. The main portion can be considered the upper part of the roll bar in such an embodiment, said upper part being connected to a metal base portion in the form of a crossmember. In the structural component of a seat, it is possible for example for a planar extent of the main portion to provide protection against penetration of articles from the rear. The metal base portion can provide a frame structure which connects the seat to the body of the vehicle. In a battery carrier, mechanical stabilization by corresponding main portions is likewise conceivable both in a planar and in a profiled structure, said main portions being connected to a metal frame as the base portion. It is also conceivable to equip a complete structural component of the body itself with the functionality according to the invention of a hybrid component. The same goes for a cockpit carrier of a cockpit of a vehicle, wherein, in this case, a crossmember of the body structure is again provided in particular as the metal base portion.

A method for producing a hybrid component according to an embodiment of the invention is likewise a subject of the present invention, having the following steps of: forming the metal base portion, forming the main portion from continuous fiber reinforced thermoplastic, forming the intermediate portion from plastic, connecting the base portion, the main portion and the stabilizing portion together by way of a force fit.

Through the formation of a hybrid component according to an embodiment of the invention, a method according to an embodiment of the invention entails the same advantages as have been explained in detail with respect to a hybrid component according to the invention. It is already apparent from the individual steps that in particular the three steps of forming the individual portions can be carried out separately and thus temporally in parallel with one another. It is already apparent here how cost-effective, quick and easy a hybrid component according to the invention is producible by a method according to the invention.

A method according to an embodiment of the invention can be developed such that, for connecting by way of a force fit, the base portion, the stabilizing portion and the main portion are laid in a mold and a subsequent injection-molding operation and/or pressing operation is carried out. It can be readily seen here how the form-fitting and/or cohesive and/or force-fitting connection can be achieved by a simple final common step of the method. A mold can have a corresponding cavity such that the relative positioning of the individual portions with respect to one another is substantially predetermined. Subsequently, the desired connection is achieved by the introduction of additional plastic material, in the form of an injection-molding operation, and/or of pressure or heat by the pressing operation. Of course, the above-described thermal consolidation of the continuous fibers by the thermoplastic materials in the main portion is also conceivable in such an operation or in a separate operation. In the context of the present invention, metal materials that are usable for the base portion can in principle be steel, aluminum, magnesium, titanium and/or corresponding alloys. The main portion is in particular also produced with a subsequent consolidation step through a wrapping process or a braiding process. Furthermore, the main portion can have textile reinforced, woven-fabric reinforced and/or laid-fabric reinforced thermoplastic. In such a case, use can be made of what is known as interval hot pressing and/or what is known as a double wall press. As thermoplastic, use is made in particular of polypropylene or polyamide or PPA. Within the meaning of the present invention, fibers, in particular for the continuous fiber reinforcement, are in particular glass, basalt, aramid and/or carbon.

FIGS. 1 to 4 show an embodiment of a hybrid component 10 according to the invention in the form of a roll bar. The roll bar, as hybrid component 10, is in this case provided with the three basic portions, namely the base portion 20, the stabilizing portion 30 and the main portion 40. In the assembly according to FIG. 1, the interaction thereof for force transmission is readily apparent. Forces which act on the main portion 40 in the event of the vehicle overturning are focused in terms of their action in particular on compressive forces, and foreseeable. As soon as these forces have been introduced into the main portion 40, they are passed on to the metal base portion 20 via the stabilizing portion 30, which in this case has ribs 32 as a mechanical stabilizing structure.

Figure 2:
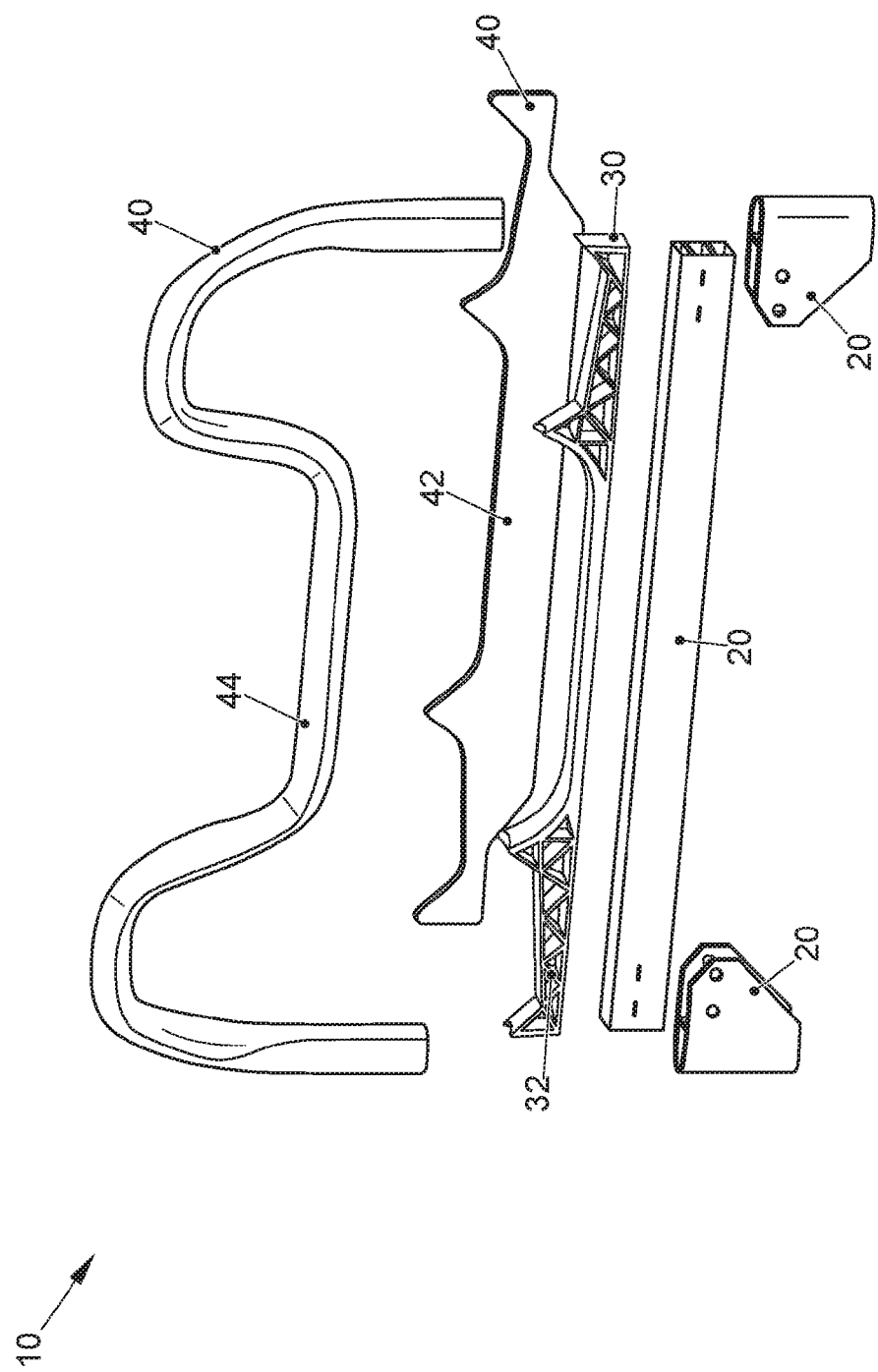
FIG. 2 shows an exploded illustration of the embodiment in FIG. 1.

FIG. 2 shows an exploded illustration of the individual portions in more detail. Thus, in this case, the main portion 40 is formed in two parts, having a main-portion profile 44 which forms the main part of the roll bar. In order to provide a lateral crossmember and to avoid corresponding deformations through the absorption of tensile, compressive and shear stresses, a main-portion surface 42 is additionally provided in the main portion 40, said main-portion surface 42 being positioned from behind. For support and stabilizing the main-portion surface 42, a stabilizing portion 30 made of plastic and having a multiplicity of ribs 32 is positioned in front. The overall forces are first of all introduced into a crossmember of the metal base portion 20 before the latter has corresponding fastening interfaces at the two ends of the metal base portion 20, in order to introduce the absorbed and discharged forces into the body as the basic structure of the vehicle.

Figure 3:
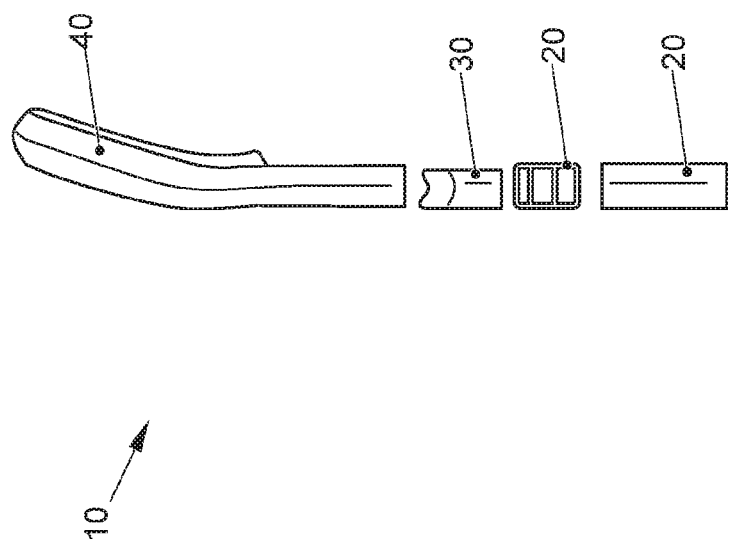
FIG. 3 shows a lateral exploded illustration of the embodiment in FIGS. 1 and 2.

FIG. 3 shows a lateral illustration of FIG. 2. It is readily apparent here how in particular the metal base portion 20 is formed here as a hollow profile having a plurality of individual cavities.

Figure 4:
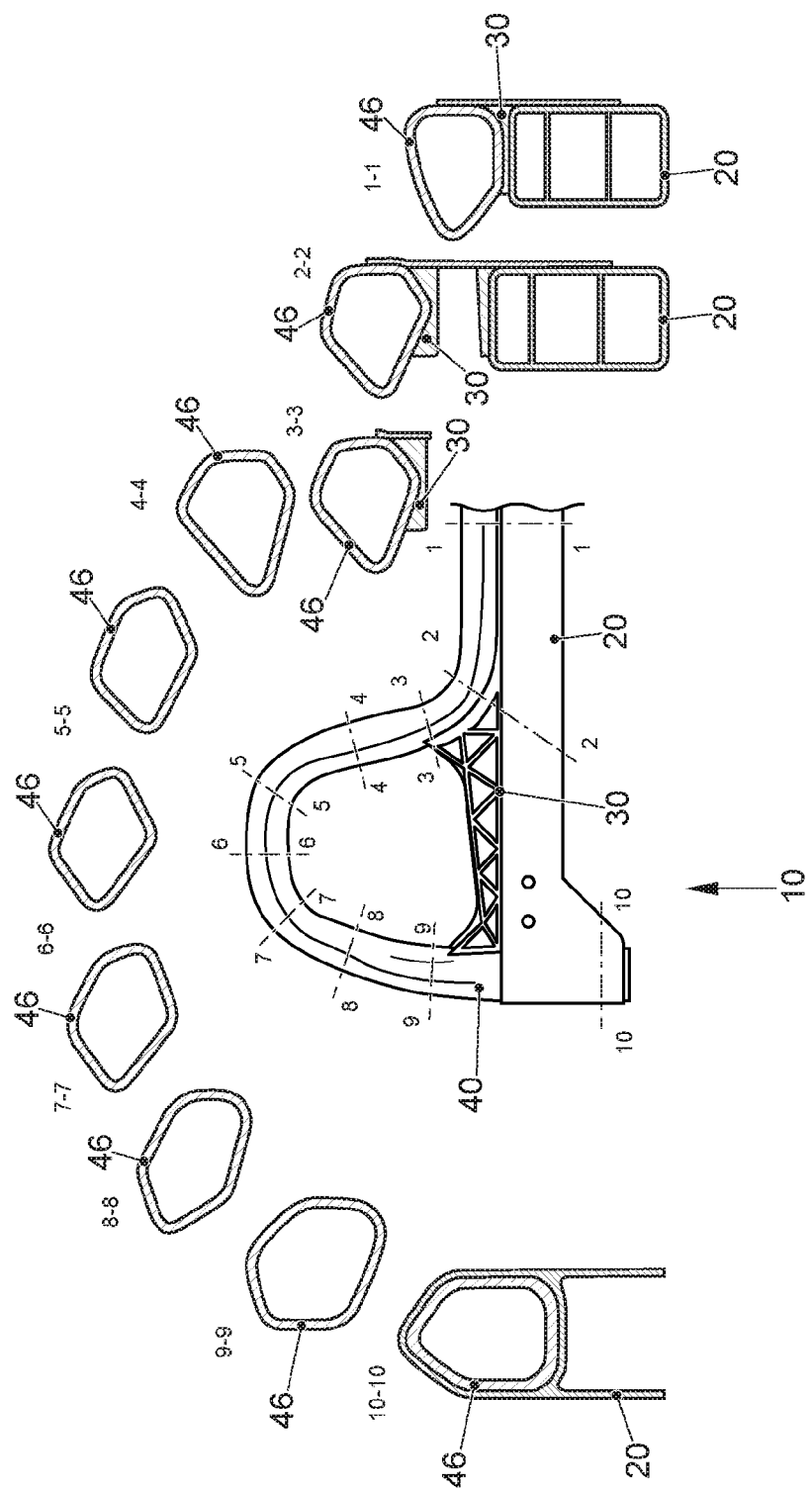
FIG. 4 shows the embodiment in FIGS. 1 to 3 with a multiplicity of cross sections.

It is clear from FIG. 4 how an advantage of a hybrid component 10 according to the invention can have consequences. Thus, it is readily apparent here that the main portion 40 is equipped here with a main-portion profile 44 which has a varying cross section 46 via a multiplicity of different section planes, namely the section planes 1-1 to 10-10. It is also readily apparent here how, at the first end, this cross section 46 forms a form fit and material bond with the metal base portion 20. At the other end of the roll bar, or in the central region of the hybrid component 10, a partial form fit and material bond is now apparent between the main portion 40 and the stabilizing portion 30.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A hybrid component for a vehicle, the hybrid component comprising:
    at least one metal base portion configured to be attached to a basic structure of the vehicle,
    at least one stabilizing portion made of plastic for mechanically stabilizing the hybrid component, and
    at least one main portion made of continuous fiber reinforced thermoplastic for absorbing forces that act on the hybrid component,
    wherein the hybrid component is formed, at least in part, as a hollow profile, and
    wherein the stabilizing portion and/or the main portion have at least one insert in the form of at least one metal insert for local mechanical stabilization of the stabilizing portion and/or of the main portion.

2. The hybrid component as claimed in claim 1, wherein the main portion has, at least in part, a flat, main-portion surface.

3. The hybrid component as claimed in claim 1, wherein the main portion has, at least in part, a main-portion profile which is formed, at least in part, as a hollow profile.

4. The hybrid component as claimed in claim 1, wherein the stabilizing portion is formed, at least in part, in the form of ribs and has at least one of the following mechanical reinforcements: short fibers, long fibers, and particles.

5. The hybrid component as claimed in claim 1, wherein the metal base portion is formed, at least in part, as a hollow profile made of steel, aluminum, or magnesium.

6. The hybrid component as claimed in claim 1, wherein the base portion and/or the stabilizing portion and/or the main portion are connected to at least one of the adjoining portions in a force-transmitting manner by a form fit and/or by a material bond and/or by a force fit.

7. The hybrid component as claimed in claim 1, wherein the main portion has a varying cross section in the form of a varying profile cross section over its geometric profile.

8. The hybrid component as claimed in claim 1, wherein the hybrid component is formed at least partially as at least one of the following components: a roll bar, a structural component of a seatbattery carrier for electrically powered vehicles, and a structural component of the bodycockpit carrier.

9. The hybrid component as claimed in claim 1, wherein continuous fiber reinforced thermoplastic is a plastic having reinforcing fibers selected from one of the group consisting of glass fibers, aramid fibers, basalt fibers, carbon fibers, or a mixture thereof.

10. A method for producing a hybrid component, the method comprising:
    forming a metal base portion configured to be attached to a basic structure of a vehicle,
    forming a main portion made of continuous fiber reinforced thermoplastic for absorbing forces that act on the hybrid component,
    forming an intermediate portion made of plastic for mechanically stabilizing the hybrid component,
    connecting the base portion, the main portion, and the stabilizing portion together by way of a force fit.

11. The method as claimed in claim 10, wherein, for connecting the base portion, the stabilizing portion, and the main portion by way of the force fit, the base portion, the stabilizing portion, and the main portion are laid in a mold and a subsequent injection-molding operation and/or pressing operation is carried out.

12. A hybrid component for a vehicle, the hybrid component comprising:
    a metal base portion configured to be attached to a basic structure of the vehicle,
    a stabilizing portion made of plastic for mechanically stabilizing the hybrid component, and
    a main portion made of continuous fiber reinforced thermoplastic for absorbing forces that act on the hybrid component,
    wherein the hybrid component is formed, at least in part, as a hollow profile, and
    wherein the base portion, the main portion, and the stabilizing portion are connected together by way of a force fit.

13. A hybrid component for a vehicle, the hybrid component comprising:
    a metal base portion configured to be attached to a basic structure of the vehicle,
    a stabilizing portion made of plastic for mechanically stabilizing the hybrid component, and
    a main portion made of continuous fiber reinforced thermoplastic for absorbing forces that act on the hybrid component,
    wherein the hybrid component is formed, at least in part, as a hollow profile, and
    wherein the main portion is formed in two parts, wherein the two parts include a first part and a second part.

14. The hybrid component as claimed in claim 13, wherein the first part has a varying cross section.

15. The hybrid component as claimed in claim 14, wherein at a first portion of the first part, the varying cross section forms a form fit with the metal base portion.

16. The hybrid component as claimed in claim 15, wherein at a second portion of the first part, the varying cross section forms a partial form fit with the stabilizing portion.

* * * * *